(12) United States Patent
Cho et al.

(10) Patent No.: US 6,509,708 B2
(45) Date of Patent: Jan. 21, 2003

(54) MOTOR DRIVING CIRCUIT USING A PWM INPUT SIGNAL

(75) Inventors: Hyun-Min Cho, Seoul (KR); Yong-Bae Park, Pusan (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 0 days.

(21) Appl. No.: 09/930,617

(22) Filed: Aug. 15, 2001

(65) Prior Publication Data

US 2002/0024313 A1 Feb. 28, 2002

(30) Foreign Application Priority Data

Aug. 29, 2000 (KR) .......................... 2000-50549

(51) Int. Cl.[7] .............................................. G05B 11/28
(52) U.S. Cl. ...................................... 318/599; 388/804
(58) Field of Search ................................ 318/560, 599; 388/804, 811, 829

(56) References Cited

U.S. PATENT DOCUMENTS 5,543,704 A    8/1996  Thorén
6,208,280 B1 * 3/2001  Baker et al. ............... 341/152

* cited by examiner

*Primary Examiner*—Jeffrey Donels
(74) *Attorney, Agent, or Firm*—Alston & Bird LLP

(57) ABSTRACT

A motor drive apparatus that includes a digital controller for generating pulse width modulation (PWM) signals with predetermined duty factors, duty capacitors for converting the PWM signals into drive voltages applied to the motors; low pass filters for generating DC drive signals by removing AC components, and a PWM decoder for generating a voltage across the duty capacitors by charging the duty capacitors in one predetermined state (either high or low) of the PWM signals, and by discharging the duty capacitors in the other state of the PWM signals. Using the present invention, a motor can be driven with a digital controller not equipped with a D/A converter; and a drive voltage applied to the motor can be controlled by a gain of the amplifier and a power supply voltage.

8 Claims, 3 Drawing Sheets

MOTOR DRIVING CIRCUIT USING A PWM INPUT SIGNAL

FIELD OF THE INVENTION

The present invention relates to a motor driving apparatus. More specifically, the present invention relates to an apparatus that employs a pulse width modulation (PWM) signal to drive a motor.

BACKGROUND OF THE INVENTION

In a reading or writing apparatus for optical disks such as a compact disk-read only memory (CD-ROM), a CD-rewritable (CD-RW), a digital video disk-ROM (DVD-ROM), a DVD-random access memory (DVD-RAM), a DVD-RW and a mini disk (MD), a plurality of motors are typically implemented. Examples include a DC motor or a spindle motor for rotating an optical disk, a sled motor for moving an optical pickup, a loading motor for loading an optical disk and actuators such as tracking and focus for reading or writing signals.

FIG. 1 shows a conventional motor driving apparatus. As shown in FIG. 1, BTL (Balanced Transformerless) drive technology is usually employed in the conventional motor driving apparatus.

An analog signal is applied to an input terminal 5 of the BTL driving circuit, and is compared with a reference voltage (Vref) to determine levels and also polarities of a voltage and a current. A digital controller (not illustrated in FIG. 1), for example, a digital signal processor or a micro computer, is usually used to perform calculations of digital signals to determine the input of the BTL drive type circuit. Consequently, a digital to analog (D/A) converter or a digital controller equipped with a D/A converter is required, thereby increasing the overall cost of the control system.

There is another problem in relation to the performance of the digital controller in the conventional apparatus. That is, the output voltage (Vout) is generally limited by three factors: 1) the power supply voltage (not illustrated in FIG. 1) of the BTL type drive circuit, 2) the input voltage of amplifiers 2 and 3, and 3) the gains of the amplifiers 2 and 3. The input voltage is generally lower than the power supply voltage of the digital controller because it is also an output voltage of the digital controller, and the gain of the amplifier is generally above 1.

Variations in the output voltage resulting from changes in the above-mentioned factors will be described below in detail.

For example, it is possible to obtain an input voltage of up to 5V in the case where the power supply voltage of the BTL type drive circuit is 12V, the saturation voltage of the amplifier is 2V, the gain of the amplifier is 2, and the maximum voltage, which can be applied to the motor, is about 10V.

First, the power supply voltage of the BTL drive circuit can limit the output voltage. When the power supply voltage of the BTL type drive circuit decreases to 5V, an input voltage above 2.5V does not change the output voltage that is applied to the motor. This problem can be solved by adding a resistor in series to the input terminal 5 (in other words, by decreasing the gain of the amplifier).

Second, the power supply voltage of the digital controller can limit the output voltage. When the digital controller employs 3.3V as the power supply voltage and the gain of the amplifier is 2, the maximum voltage applied to the input terminal 5 is 3.3V, and consequently the maximum output voltage is 6.6V.

As described above, with the conventional apparatus, the gain of the amplifier must be modified to avoid limitations in the output voltage, when the power supply voltage or the input voltage of the BTL drive circuit varies.

SUMMARY OF THE INVENTION

It is an object of the present invention to provide a motor drive apparatus, wherein a motor can be driven with a digital controller not equipped with a D/A converter; and a drive voltage applied to the motor can be controlled solely by a gain of an amplifier and a power supply voltage, with no dependence on the input signal from the digital controller.

To achieve the above object, the present invention provides a PWM input motor drive apparatus.

The PWM input motor drive apparatus in the present invention comprises motors, a digital controller, PWM decoders, duty capacitors, low pass filters and amplifiers.

The motor is used for converting electric energy into mechanical energy to carry out a predetermined function, and the digital controller generates PWM input signals with a predetermined duty factor.

The duty capacitors convert the PWM signals into driving voltages applied to the motors.

The PWM decoder generates a voltage across the duty capacitors by charging the duty capacitors during one predetermined state (either high or low) of the PWM signal and discharging the duty capacitors during the other state of the PWM signal.

The low pass filter removes an AC component of the voltage across the duty capacitors, and consequently converts the voltage into a DC drive signal.

The preferred PWM decoder in the present invention comprises a signal transformation device, a first switch, a second switch, a first current source, a second current source and a signal adjustment resistor.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Preferred embodiments of the present invention will now be described in detail, with reference to the accompanying drawings.

Figure 1:
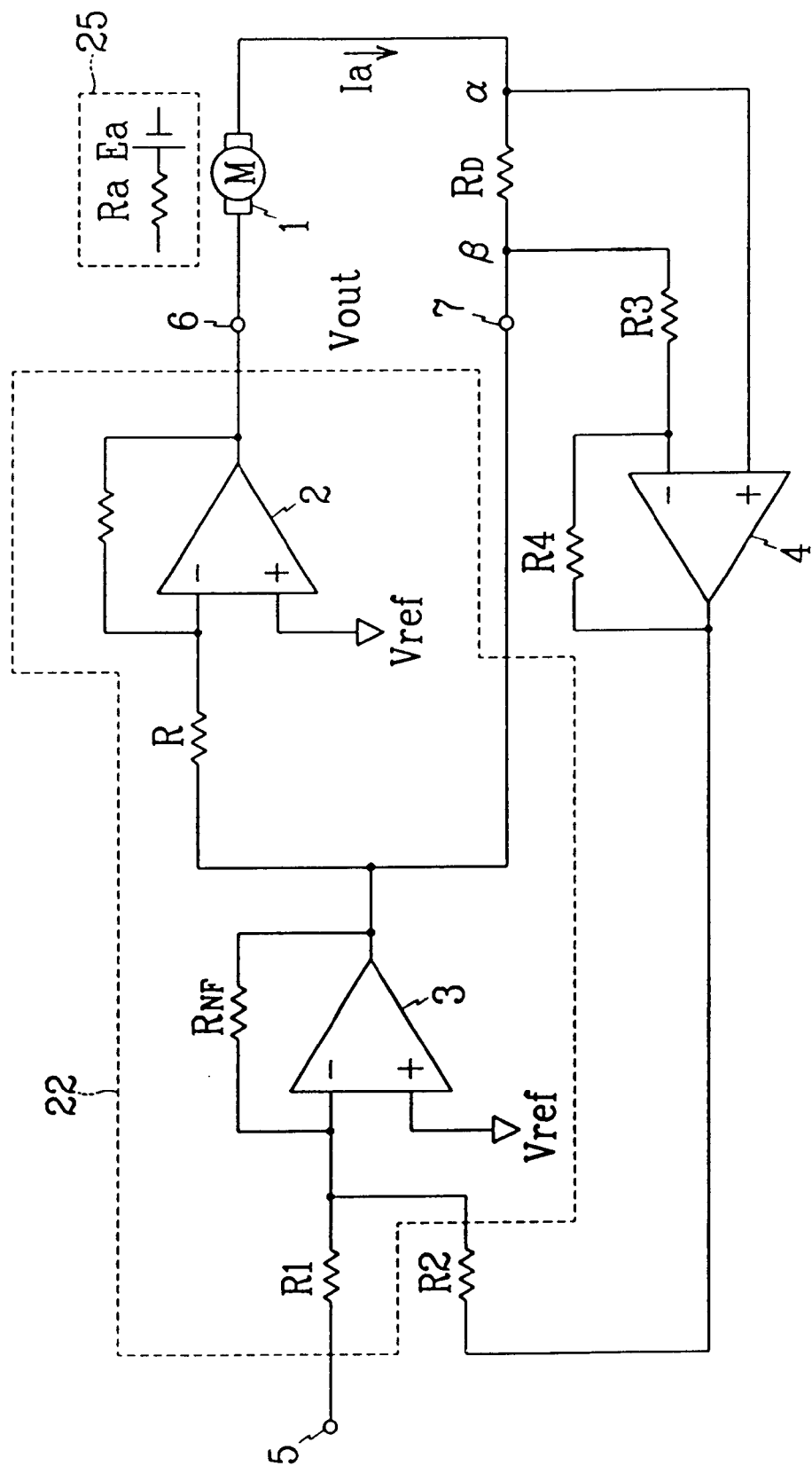
FIG. 1 schematically shows an example of the conventional BTL type apparatus for driving a motor, in accordance with the prior art.
Figure 2:
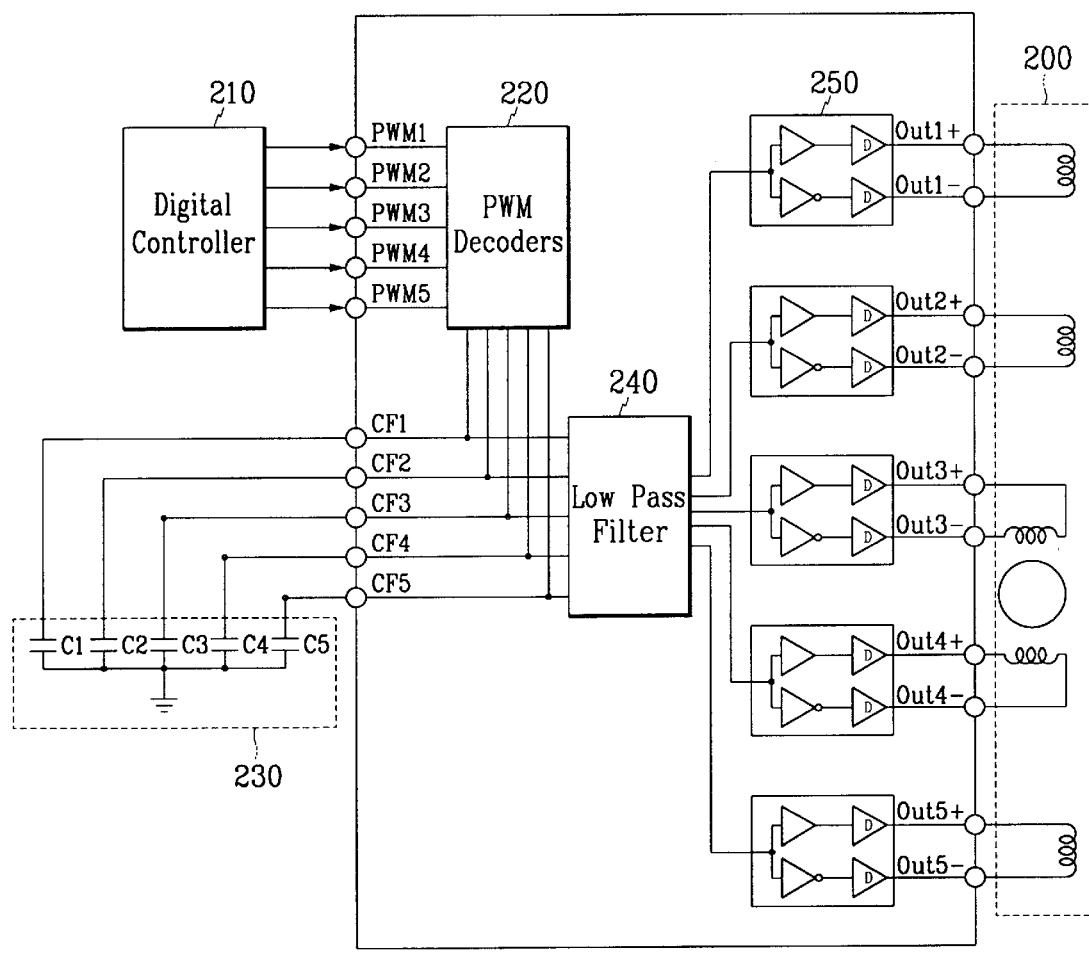
FIG. 2 is a block diagram of a PWM input motor drive apparatus, in accordance with the present invention.

FIG. 2 is a block diagram of a PWM input motor drive apparatus to which the present invention is applied. As shown in FIG. 2, the PWM input motor drive apparatus comprises motors 200, a digital controller 210, PWM decoders 220, duty capacitors 230, low pass filters 240 and amplifiers 250.

The motor 200 is used for converting electric energy into mechanical energy to carry out a predetermined function.

The digital controller 210 generates PWM input signals that are directly used in the present invention without digital to analog (D/A) conversion. Hence, the digital controller needs not be equipped with a D/A converter, and therefore the total cost of the motor drive system can be reduced.

The PWM decoder 220 and the duty capacitor 230 convert the PWM signals into voltage signals that are proportional to a duty factor in order to generate a drive voltage for application to the motor 200. The low pass filter 240 receives the above voltage signals and removes an AC component from the same such that the voltage signals are converted into DC drive signals.

The amplifier 250 amplifies the above DC drive signals from the low pass filter by a predetermined gain, and then the amplified signals are supplied to the motor 200 to drive the motor 200.

Next, the operation of the PWM decoder 220 in the preferred embodiment will now be described in detail.

Figure 3:
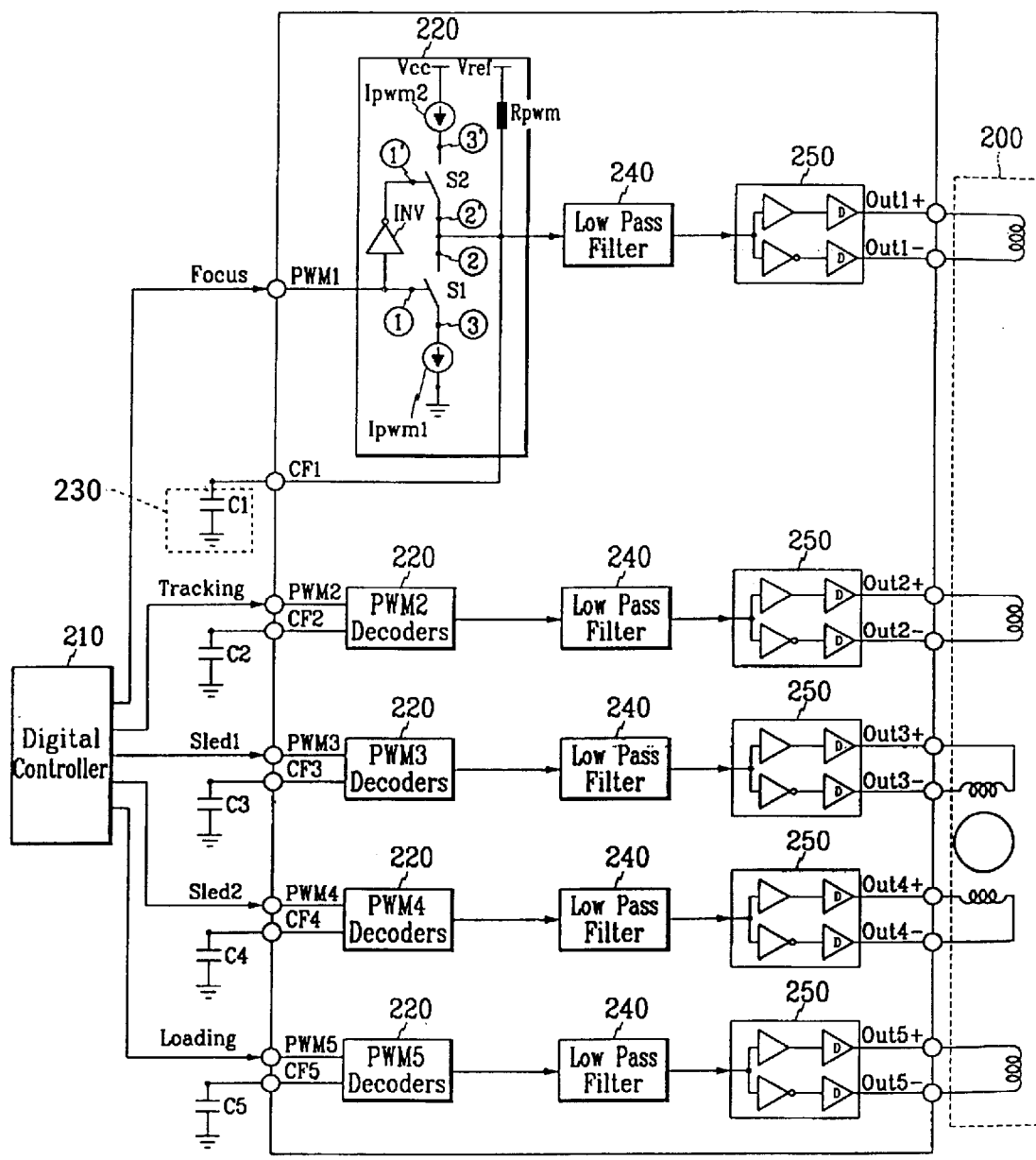
FIG. 3 schematically represents a circuit of a PWM input motor drive apparatus, in accordance with the present invention.

FIG. 3 shows a preferred circuit of the PWM decoder 220. As shown in FIG. 3, the preferred PWM decoder 220 comprises a signal transformation device INV, a first switch S1, a second switch S2, a first current source Ipwm1, a second current source Ipwm2 and a signal adjustment resistor Rpwm.

The signal transformation device INV includes an inverter, the input terminal of which is connected to the output terminal of the digital controller 210. The signal transformation device INV receives the PWM input signals and inverts the state of the signals. For instance, when the PWM signals are in a high state, the signal transformation device INV converts the signals into a low state.

The first switch S1, one terminal 1 of which is connected to a common node of the signal transformation device INV and the digital controller 210 and another terminal 2 of which is connected to a terminal of the duty capacitor 230, turns on in one state (either high or low) of the PWM signals and turns off in the other state.

The second switch S2, one terminal 1' of which is connected to the other node of the signal transformation device INV and another terminal 2' of which is connected to the terminal of the duty capacitor 230, turns off in one state (either high or low) of the PWM signals and turns on in the other state.

The first current source (Ipwm1), one terminal of which is connected to a terminal 3 of the first switch and the other terminal of which is grounded, supplies a current for discharging the duty capacitor 230 when the first switch S1 is on. The second current source (Ipwm2), one terminal of which is connected to a terminal 3' of the second switch S2 and the other terminal of which is connected to a power supply voltage (Vcc), supplies a current for charging the duty capacitor 230 when the second switch S2 is on. The signal adjustment resistor (Rpwm), one terminal of which is connected to a reference voltage (Vref) and the other terminal of which is connected to the common node of the duty capacitor 230, the terminal 2 of the first switch S1 and the terminal 2' of the second switch S2, determines a level of voltage that is applied to the duty capacitor 230.

In the present invention, the first state, the second state and the third state are defined as a high state, a low state and a high impedance state, respectively. In the high impedance state, both the first switch S1 and the second switch S2 are set to turn off.

Next, the operation of the PWM decoder 220 in the preferred embodiment will now be described in detail, with reference to the FIG. 3.

When the PWM signal is in the high impedance state, both the first switch S1 and the second switch S2 turn off. Hence, the charging or discharging current does not flow and the voltage across the duty capacitor 230 equals the reference voltage (Vref). If the reference voltage of the amplifier 250 is same as the power supply voltage, the voltage applied to the motor 200 is zero, and therefore the motor 200 stops.

The duty capacitor 230 is discharged by the first current source (Ipwm1) and charged by the second current source (Ipwm2). At this time, the signal adjustment resistor Rpwm limits the voltage across the duty capacitor 230. When the state of the PWM signals is low, the first switch S1 turns off and the second switch S2 turns on. Therefore, the second current source Ipwm2 injects a charge into the duty capacitor 230 and the voltage across the duty capacitor 230 increases. The voltage across the duty capacitor 230 does not exceed a maximum voltage Vc1 (maximum), the equation of which is as follows.

$$Vc1\ (maximum) = Vref + (Ipwm2 \times Rpwm) \quad \text{[Equation 1]}$$

On the other hand, when the state of the PWM signal is high, the first switch S1 turns on and the second switch S2 turns off. Therefore, the first current source Ipwm1 discharges the duty capacitor 230 and the voltage across the duty capacitor 230 decreases. The voltage across the duty capacitor 230 does not fall below a minimum voltage Vc1(minimum), the equation of which is as follows.

$$Vc1\ (minimum) = Vref - (Ipwm1 \times Rpwm) \quad \text{[Equation 2]}$$

Hence, when the duty factor of the PWM1 signals is 0%, the voltage across the duty capacitor 230 becomes the maximum voltage Vc1 (maximum), and when the duty factor of the PWM1 signals is 100%, the voltage across the duty capacitor 230 becomes the minimum voltage Vc1 (minimum). When the duty factor of the PWM signals is a value between 0% and 100%, a drive voltage, in proportion to the duty factor of the PWM signals from the digital controller 210, is applied across the duty capacitor 230. In addition, the magnitudes of the currents, supplied by both the first current source (Ipwm1) and the second current source (Ipwm2), are the same in the preferred embodiment of the present invention.

The low pass filter 240 generates DC drive signals as described above, and the amplifier 250 receives the DC drive signals as an input. Also, the amplifier 250 generates a motor drive voltage which is proportional to the difference between the above DC drive signals and a predetermined reference voltage and which is amplified by a predetermined gain. The output voltage determines also a rotating direction of the driven motor 200.

Accordingly, in the present invention, a drive voltage applied to the motor 200 is not dependent on a level of the input PWM signals from the digital controller 210, and instead is dependent on the power supply voltage and the gain of the amplifier 250 in the motor drive apparatus. This is the result of the input PWM signals being used only for turning the first switch S1 and the second switch S2 on/off.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, a digital controller can be used for controlling a plurality of motors.

In summary, using the present invention, a motor can be driven with a digital controller not equipped with a D/A converter; and a drive voltage applied to the motor can be controlled by a gain of the amplifier and a power supply voltage, and is not dependent on a level of the input signal from the digital controller.

What is claimed is:

1. An apparatus for driving a motor comprising:
    a digital controller for generating pulse width modulation (PWM) signals with predetermined duty factors;
    one or more duty capacitors, in electrical communication with the digital controller, for converting PWM signals generated by the digital controller into driving voltages applied;
    one or more PWM decoders, in electrical communication with the digital controller and the one or more duty capacitors, wherein the PWM decoders generate a voltage of the duty capacitors such that the following operations are repeatedly carried out:
        charging the duty capacitors when the PWM signal is in one predetermined state; and
        discharging the duty capacitor when the PWM signals are in a state in opposition to the predetermined state; and
    one or more low pass filters, in electrical communication with the PWM decoders, that generate DC drive signals by removing the AC component of the signal coming from the PWM decoders.

2. The apparatus of claim 1, further comprising one or more motors, in electrical communication with the one or more low pass filters, that convert electrical energy into mechanical energy and carry out predetermined functions.

3. The apparatus of claim 1, further comprising a one or more amplifiers, in electrical communication with the one or more low pass filters, for amplifying a difference between the DC output voltage of the one or more low pass filters and a reference voltage by a predetermined gain.

4. The apparatus of claim 1, wherein the one or more PWM decoders comprise:
    a signal transformation device for inverting a predetermined state of an output signal from the digital controller;
    a first switch, one terminal of which is connected to a common node of the signal transformation device and the digital controller and another terminal of which is connected to a terminal of the duty capacitor, the first switch turning on in one state of the PWM signal and turning off in the other state;
    a second switch, one terminal of which is connected to an output node of the signal transformation device and another terminal of which is connected to the terminal of the duty capacitor, the second switch turning off in one state of the PWM signal and turning on in the other state;
    a first current source, one terminal of which is connected to a terminal of the first switch and the other terminal of which is grounded, the first current source supplying a current for discharging the one or more duty capacitors when the first switch turns on;
    a second current source, one terminal of which is connected to a terminal of the second switch and the other terminal of which is connected to a power supply voltage, the second current source supplying a current for charging the one or more duty capacitors when the second switch turns on; and
    a signal adjustment resistor, one terminal of which is connected to a reference voltage and the other terminal of which is connected to the common node of the one or more duty capacitors, the first switch and the second switch, the signal adjustment resistor determining a level of voltage applied across the one or more duty capacitors.

5. The apparatus of claim 1, wherein the PWM decoder is used to:
    maximize a voltage of the one or more duty capacitors by fully charging in one state of a 100% or 0% duty factor; and
    minimize a voltage of the one or more duty capacitors by fully discharging in the other state of a 100% or 0% duty factor.

6. The apparatus of claim 4, wherein the PWM decoder is used to:
    maximize a voltage of the one or more duty capacitors by fully charging in one state of a 100% or 0% duty factor; and
    minimize a voltage of the one or more duty capacitors by fully discharging in the other state of a 100% or 0% duty factor.

7. The apparatus of claim 4, wherein both the first switch and the second switch of the PWM decoder are set to turn on or off when the PWM decoder is in a high impedance state.

8. A PWM decoder comprising:
    duty capacitors for determining a voltage applied to a motor depending on a duty factor of a PWM signal;
    a signal transformation device for receiving the PWM signal as an input and inverting the same;
    a first switch, one terminal of which is connected to an input terminal of the signal transformation device and the other terminal of which is connected to a terminal of the duty capacitors, the first switch turning on in one state of the PWM signal and turning off in the other state;
    a second switch, one terminal of which is connected to an output terminal of the signal transformation device and the other terminal of which is connected to the terminal of the duty capacitors, the second switch turning off in one state (either high or low) of the PWM signal and turning on in the other state;
    a first current source, one terminal of which is connected to one of the terminals of the first switch and the other terminal of which is grounded, the first current source supplying a current for discharging the duty capacitors when the first switch turns on;
    a second current source, one terminal of which is connected to one of the terminals of the second switch and the other terminal of which is connected to a power supply voltage, the second current source supplying a current for charging the duty capacitors when the second switch turns on; and
    a resistor, one terminal of which is connected to a reference voltage and the other terminal of which is connected to a common node of the duty capacitors, the first switch and the second switch, the resistor determining a level of a voltage applied across the duty capacitors.

* * * * *